10

United States Patent Office 2,744,108
Patented May 1, 1956

2,744,108

3-ETHYLENE MERCAPTOLES OF 11-OXYGENATED DERIVATIVES OF 17,21-DIHYDROXY-4-PREGNENE-3,20-DIONES

Jack W. Ralls, Morton Grove, Ill., assignor, by mesne assignments, to G. D. Searle & Co., Skokie, Ill., a corporation of Delaware No Drawing. Application January 13, 1955,
Serial No. 481,687

7 Claims. (Cl. 260—239.5)

My present invention relates to a new group of monomercaptoles of polyketosteroids and, more specifically, to 3-ethylene mercaptoles of 11-oxygenated derivatives of 17,21-dihydroxy-4-pregnene-3,20-diones.

The compounds which constitute this invention can be represented by the general structural formula

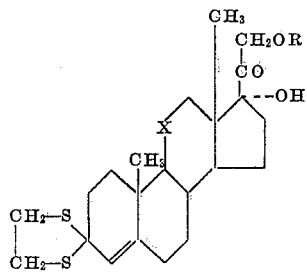

wherein X is a member of the class consisting of carbonyl and carbinol radicals, and R is a member of the class consisting of hydrogen, benzoyl and lower alkanoyl radicals such as formyl, acetyl, propionyl, butyryl, valeryl, caproyl, cyclohexaneacetyl, cyclopentanepropionyl, and the like.

The ease of formation and chemical stability of mercaptoles makes these compounds attractive intermediates in multi-stage syntheses. The studies of Hauptmann (Jour. Amer. Chem. Soc., vol. 69, 562; 1947) and of Ruff and Reichstein (Helvetica Chimica Acta, vol. 34, 70; 1951) on the reaction of steroid ketones with ethanedithiol have demonstrated that this dimercaptan group will condense with carbonyl functions at the 3-, 7-, 12-, 17-, and 20-positions; the hindered 11-position is the only site of unreactivity. This situation has been used to advantage in the selective formation of 7-mercaptoles from 7,11-diones and 12-mercaptoles from 11,12-diones. A higher order of selectivity is required when the competitive reaction is between the 3- and 20-positions. I have found that the 3-keto group reacts under very mild conditions, for instance acetic acid as a solvent and p-toluenesulfonic acid at a catalyst. Under these conditions, reaction can be made to take place at the 3-position in preference to the 11- and 20-position.

The compounds of this invention are valuable intermediates in the synthesis of ketosteroids. Formation of these monomercaptoles protects the 3-keto group while other keto groups undergo chemical conversions. After such chemical conversions, the 3-ethylene mercaptole group is conveniently reconverted to a 3-keto group by treatment with mercuric chloride and cadmium carbonate in aqueous acetone. However, the utility of these compounds is not limited to their use as intermediates in organic synthesis. The mercaptoles of this invention have unusual pharmaceutical properties. Thus, they are active lympholytic agents but lack many of the other effects of cortisone. In addition, they inhibit the luteoid effects of progesterone.

The following examples illustrate in further detail some of the compounds which constitute the invention and methods for their synthesis. However, the invention is not to be construed as limited in spirit or in scope by the details set forth therein. It will be apparent to those skilled in the art that numerous modifications in materials and in methods can be adopted without departing from the invention in spirit or in scope. In these examples, quantities of materials are indicated in parts by weight.

This application is a continuation-in-part of my copending application, Serial No. 425,023, filed April 22, 1954.

Example 1

To a solution of 12.06 parts of cortisone acetate in 263 parts of warm acetic acid are added 2.46 parts of ethanedithiol and a solution of 2.7 parts of p-toluene-sulfonic acid monohydrate in 32 parts of acetic acid. The mixture is maintained at room temperature for 15 hours after which the solid precipitate is collected on a filter and recrystallized from acetone to yield 17-hydroxy-21-acetoxy-4-pregnene-3,11,20-trione 3 - ethylene mercaptole melting at about 256–258° C. An 0.5% chloroform solution shows a specific rotation of +210°. The infrared absorption spectrum as determined in a potassium bromide disc shows maxima at about 2.96, 5.74, 5.82, 5.95, 7.30, 7.91, 8.0, and 9.52 microns.

Substitution of an equivalent amount of the cyclopentylpropionate for the acetate of cortisone in the foregoing procedure yields the 17-hydroxy-21-(cyclopentylpropionoxy)-4-pregnene-3,11,20-trione 3-ethylene mercaptole.

Example 2

To a solution of 4.4 parts of 17-hydroxy-21-acetoxy-4-pregnene-3,11,20-trione 3-ethylene mercaptole in 750 parts of 95% methanol, there are added in the course of 15 minutes 88 parts of 0.5-N methanolic potassium bicarbonate solution with shaking. The reaction mixture is permitted to stand at room temperature for 16 hours and then acidified with dilute acetic acid and concentrated under vacuum. On cooling, 17,21-dihydroxy-4-pregnene-3,11,20-trione 3-ethylene mercaptole is obtained which, recrystallized from a mixture of acetone and petroleum ether, melts at about 210–213° C. The infrared absorption spectrum shows maxima at 2.96, 5.88, and 9.52 microns.

The identical compound is obtained by the treatment of cortisone with ethanedithiol and p-toluene-sulfonic acid by the foregoing procedure.

Example 3

A solution of 464 parts of 17α-hydroxy-21-benzoyloxy-4-pregnene-3,11,20-trione in 10,000 parts of warm acetic acid is treated with 82 parts of ethanedithiol and a solution of 90 parts of p-toluenesulfonic acid monohydrate in 1000 parts of acetic acid. The reaction mixture is permitted to stand at 15° C. for 12 hours after which the precipitate is collected on a filter. There is thus obtained the 17α - hydroxy - 21 - benzoyloxy - 4 - pregnene-3,11,20-trione 3-ethylene mercaptole which has the structural formula

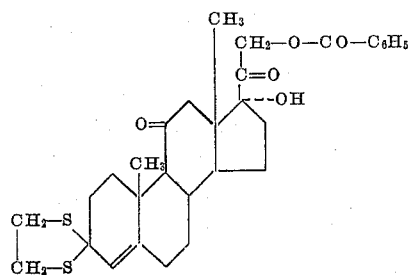

The infrared absorption spectrum shows maxima at 2.95, 5.88, 7.92, 8.92, 9.52, and 13.85 microns.

*Example 4*

A mixture of 100 parts of 17-hydroxycorticosterone acetate, 20.2 parts of ethanedithiol, 16.7 parts of p-toluenesulfonic acid monohydrate and 1750 parts of acetic acid is maintained at 10° C. for 12 hours, after which the precipitate is collected on a filter and recrystallized from acetone. The 11β,17-dihydroxy-21-acetoxy-4-pregnene-3,20-dione 3-ethylene mercaptole thus obtained melts at about 214–217° C.

*Example 5*

To a solution of 100 parts of 11β, 17-dihydroxy-21-acetoxy-4-pregnene-3,20-dione 3-ethylene mercaptole in 4000 parts of 95% methanol there is added over a period of 15 minutes one equivalent of an 0.1-N solution of sodium hydroxide in methanol with shaking. The reaction mixture is permitted to stand at room temperature for 30 minutes and then concentrated under vacuum and cooled. The precipitated 11β,17,21-trihydroxy-4-pregnene-3,20-dione 3-ethylene mercaptole is collected on a filter. Further purification can be achieved by chromatography on a silica column. The compound has the structural formula

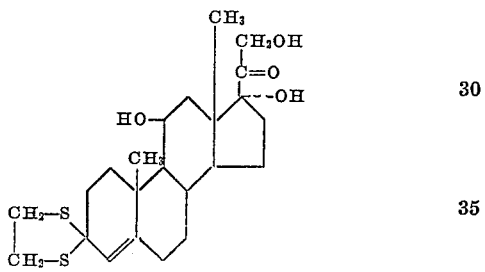

The infrared absorption spectrum shows maxima at 2.96, 5.86, and 9.52 microns.

The identical compound is obtained by treatment of hydrocortisone with ethanedithiol and p-toluenesulfonic acid by the procedure of the preceding example.

What is claimed is:

1. A compound of the structural formula

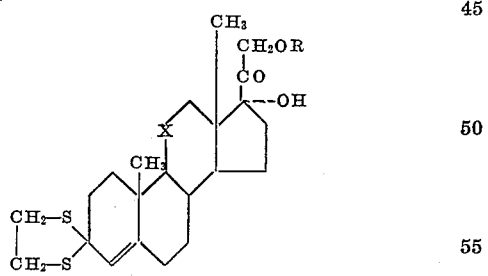

wherein R is a member of the class consisting of hydrogen, lower alkanoyl and benzoyl radicals and X is a member of the class consisting of carbonyl and carbinol radicals.

2. A compound of the structural formula

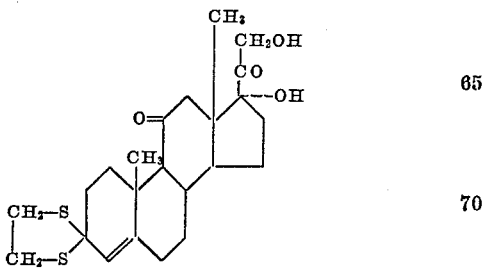

3. A compound of the structural formula

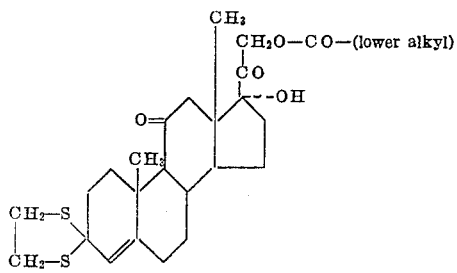

4. A compound of the structural formula

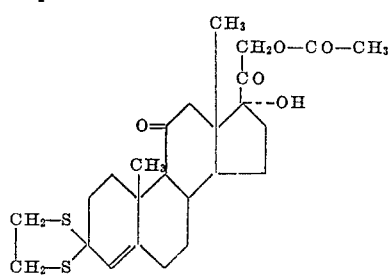

5. A compound of the structural formula

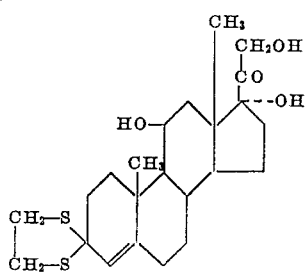

6. A compound of the structural formula

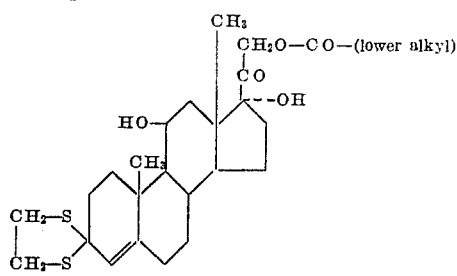

7. A compound of the structural formula

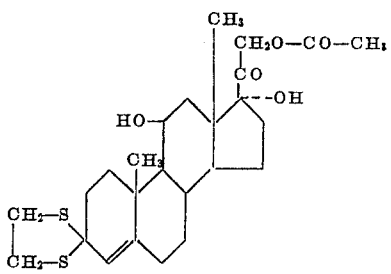

References Cited in the file of this patent

UNITED STATES PATENTS

| | | |
|---|---|---|
| 2,352,568 | Reichstein | June 27, 1944 |
| 2,464,434 | Bernstein | July 21, 1953 |

OTHER REFERENCES

Antomucci: J. Org. Chem., October 1952, pp. 1341–51.